United States Patent [19]

Adamson et al.

[11] Patent Number: 5,712,888
[45] Date of Patent: Jan. 27, 1998

[54] ALLOY FOR IMPROVED HYDRIDING RESISTANCE AND CORROSION RESISTANCE NUCLEAR REACTOR COMPONENTS

[75] Inventors: Ronald B. Adamson, Fremont; Bo-Ching Cheng, Cupertino, both of Calif.

[73] Assignee: General Electric Co., Schenectady, N.Y.

[21] Appl. No.: 658,544

[22] Filed: Jun. 5, 1996

Related U.S. Application Data

[63] Continuation-in-part of Ser. No. 412,499, Mar. 28, 1995, abandoned.

[51] Int. Cl.$^6$ ............................................. C21D 1/26
[52] U.S. Cl. ..................... 376/416; 376/457; 376/260; 420/422
[58] Field of Search ........................ 376/260–261, 376/339, 419, 457, 409, 416, 422, 900; 420/422

[56] References Cited

U.S. PATENT DOCUMENTS

| | | | |
|---|---|---|---|
| 4,094,706 | 6/1978 | Schulson et al. | 148/672 |
| 4,718,949 | 1/1988 | Takase et al. | 148/672 |
| 4,778,648 | 10/1988 | Ferrari | 376/457 |
| 4,938,920 | 7/1990 | Garzarolli et al. | 376/457 |
| 4,963,323 | 10/1990 | Matsuo et al. | 420/422 |
| 4,992,240 | 2/1991 | Komatsu et al. | 420/422 |
| 5,122,334 | 6/1992 | Bradley | 376/457 |
| 5,196,163 | 3/1993 | Matsuo et al. | 420/422 |
| 5,241,571 | 8/1993 | Pati et al. | 376/260 |
| 5,254,308 | 10/1993 | Garde et al. | 420/422 |
| 5,266,131 | 11/1993 | Foster et al. | 148/672 |
| 5,334,345 | 8/1994 | Rudling | 420/422 |
| 5,436,947 | 7/1995 | Taylor | 376/416 |

FOREIGN PATENT DOCUMENTS

| | | |
|---|---|---|
| 0 405 172 A1 | 1/1991 | European Pat. Off. . |
| 1 161 694 | 1/1964 | Germany . |

Primary Examiner—Michael J. Carone
Assistant Examiner—Matthew J. Lattig
Attorney, Agent, or Firm—Nixon & Vanderhye

[57] ABSTRACT

An alloy having improved resistance to hydriding as well as good corrosion resistance, adequate strength, fabricability and irradiation growth. These properties make the new alloy exceptionally suited for use in boiling water reactor components such as fuel channels, fuel cladding and fuel rod spacers. The class of alloys includes zirconium-based alloys having about 0.3–1.2% tin, about 0.8–1.4% chromium, about 0.05–0.7% iron, and the remainder substantially zirconium.

19 Claims, 1 Drawing Sheet

ALLOY FOR IMPROVED HYDRIDING RESISTANCE AND CORROSION RESISTANCE NUCLEAR REACTOR COMPONENTS

CROSS-REFERENCE TO RELATED APPLICATION

The present application is a continuation-in-part application of application Ser. No. 08/412,499, filed Mar. 28, 1995 (incorporated by reference) and still pending.

FIELD OF THE INVENTION

This invention generally relates to alloys useful in making nuclear reactor components. In particular, the invention relates to zirconium-based alloys useful in making components such as fuel channels, fuel cladding and fuel rod spacers in a light water nuclear reactor and having good in-reactor hydriding resistance.

BACKGROUND OF THE INVENTION

A boiling water reactor (BWR) has nuclear fuel assemblies comprising bundles of fuel rods made of fissionable materials capable of releasing a finite number of neutrons. Neutrons are released due to fission at high speed and then moderated by the water to a lower speed at which the neutrons can produce a chain reaction of fission events. Each fuel assembly is surrounded by a tubular flow channel (hereinafter "fuel channel") made of metal. These fuel channels are elongated tubular components which can parasitically absorb neutrons. In accordance with conventional practice, the preferred material is a zirconium-based alloy on the order of 125 mils thick. Zirconium-based alloys are used in nuclear reactors because of their low neutron absorption cross-section, adequate strength and good corrosion resistance in reactor water and steam.

In-reactor dimensional stability and corrosion resistance are important attributes of reactor components such as fuel channels, fuel cladding and fuel rod spacers. To minimize parasitic absorption of neutrons, fuel channels, fuel cladding and fuel rod spacers are typically fabricated from Zircaloy, which is an alloy of zirconium with small amounts of iron, tin and other alloy metals. In particular, Zircaloy-2 contains, by weight, about 1.5% tin, 0.15% iron, 0.1% chromium, 0.05% nickel and 0.1% oxygen, whereas Zircaloy-4 contains substantially no nickel and about 0.2% iron, but otherwise is similar to Zircaloy-2. High corrosion resistance for the Zircaloys is conventionally obtained by heating the channel material to an elevated temperature followed by fast quenching, e.g. by inductive heating and water quenching.

As reactor designs are changed to require longer lives of core components such as fuel channels and fuel cladding, there is a need to use alloys having improved properties. In particular, resistance to hydriding (absorption of hydrogen) and corrosion in a boiling water reactor, as compared to the Zircaloys and other zirconium-based alloys conventionally used is required. A tendency toward hydriding in zirconium alloys is known to be detrimental due to embrittlement.

SUMMARY OF THE INVENTION

The present invention is an alloy having improved resistance to in-reactor hydriding, as well as good corrosion resistance and good strength and fabricability. These properties, especially the resistance to hydriding, make the new alloy exceptionally suited for use in BWR components such as fuel channels, fuel cladding and fuel rod spacers.

The alloys of this invention are zirconium-based alloys comprising, by weight, about 0.3–1.2% Sn, about 0.8–1.4% Cr, about 0.05–0.7% Fe, and the remainder substantially zirconium. Preferred ranges are about 0.3–0.7% Sn, about 0.8–1.2% Cr, about 0.3–0.7% Fe, and the remainder substantially zirconium. A particularly preferred alloy of the invention is about 0.5% Sn, about 1.0% Cr, about 0.5% Fe and the remainder substantially zirconium.

The term "remainder substantially zirconium" as used herein means zirconium is the predominant element comprising the remaining weight percentage. However, other elements which do not interfere with the achievement of the improved hydriding resistance and good corrosion resistance, strength and ductility of the inventive alloys may be present either as impurities normally occurring in reactor grade sponge zirconium or at non-interfering levels. For example, the impurities occurring in reactor grade sponge zirconium consist of the following substances in the contents stated: aluminum, 75 ppm or less; boron, 0.4 ppm or less; cadmium, 0.4 ppm or less; carbon, 270 ppm or less; chromium, 200 ppm or less; cobalt, 20 ppm or less; copper, 50 ppm or less; hafnium, 100 ppm or less; hydrogen, 25 ppm or less; iron, 1500 ppm or less; magnesium, 20 ppm or less; manganese, 50 ppm or less; molybdenum, 50 ppm or less; nickel, 70 ppm or less; niobium, 100 ppm or less; nitrogen, 80 ppm or less; silicon, 120 ppm or less; tin, 50 ppm or less; tungsten, 100 ppm or less; titanium, 50 ppm or less; and uranium, 3.5 ppm or less. Preferably, the alloys of this invention have about 500–2000 ppm $O_2$ and are substantially nickel free. The term "substantially nickel free" as used herein means that the alloys contain only trace amounts of nickel, i.e., about 70 ppm Ni or less.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
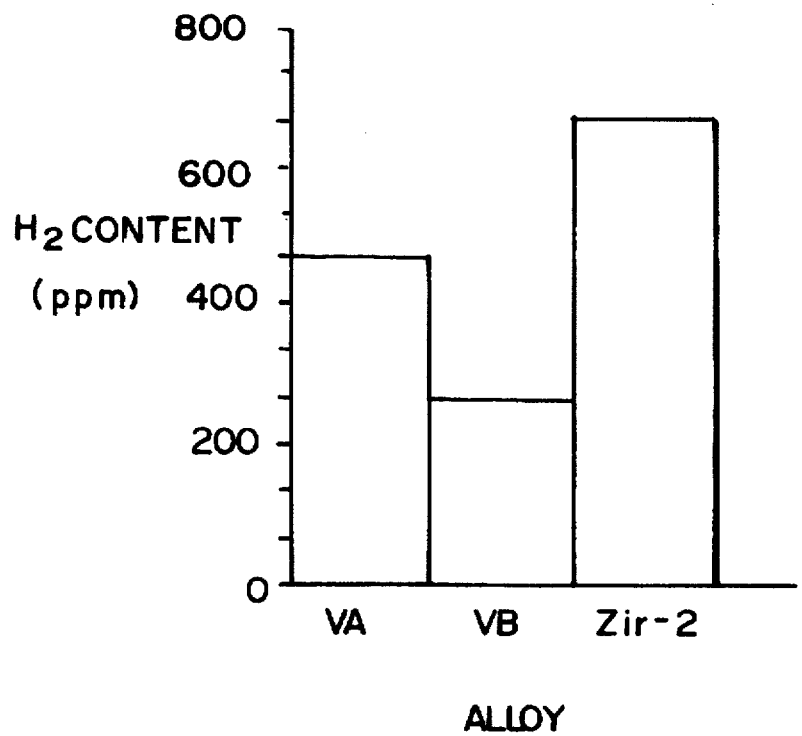
FIG. 1 is a bar graph of hydrogen content for alloys of the invention as compared to Zircaloy-2 after 280 days post-irradiation corrosion test (400° C. steam test)

The invention encompasses a class of zirconium-based alloys having particularly improved resistance to hydriding. The alloys also possess good corrosion resistance, strength and fabricability. The alloys of the invention comprise, by weight percentage, about 0.3–1.2% Sn; about 0.8–1.4% Cr; about 0.05–0.7% Fe; and remainder substantially Zr. The range of tin has been selected to reduce the variability in corrosion performance of these alloys and to provide strength. The iron provides smaller uniform precipitate size, which is desirable for corrosion resistance. The chromium level of at least 0.8 wt % provides improved hydriding resistance well as good corrosion performance. Moreover improved hydriding resistance is afforded when the ratio of Cr to Fe is preferably in the range of about 1.8 to 2.3, for example about 2. A particularly preferred example of an alloy of this invention is one comprised of about 0.5% Sn, about 1.0% Cr and about 0.5% Fe. Another example of an alloy of this invention is one comprised of about 1.0% Sn, about 1.2% Cr and about 0.1% Fe. Further preferred alloys have about 500–2000 ppm $O_2$. Still further preferred alloys are substantially nickel free.

EXAMPLES

A number of zirconium-based alloys were formed having the composition given in Table 1 below.

TABLE 1

| Alloy | Elemental Composition* (wt. %) | | |
|---|---|---|---|
| | Sn | Cr | Fe |
| V | 0 | 1.2 | 0.1 |
| VA | 1.0 | 1.2 | 0.1 |
| VB | 0.5 | 1.0 | 0.5 |
| Zirc-2† | 1.5 | 0.1 | 0.15 |

*$O_2$ in each alloy was about 500–2000 ppm.
†Also includes 0.05% Ni.

The foregoing alloys were fabricated into flat sheets, cut into coupons and irradiated in a boiling water reactor for two full reactor cycles. The fluence achieved by the coupons was $(2-4) \times 10^{25}$ neutrons/m². Corrosion performance data for V, VA and VB are given below. Comparison is also given to Zircaloy-2, which is the standard material used for BWR fuel components such as cladding and channels.

The weight gain in the coupons as the result of irradiation in the reactor for two full cycles was measured and is given in Table 2 below.

TABLE 2

| Alloys of This Invention | Alloys Not of This Invention | Corrosion Weight Gain (mg/dm²) |
|---|---|---|
| — | V | 70–783 |
| VA | — | 41–54 |
| VB | — | 45–55 |
| — | Zirc-2 | 54–113 |

The weight gain is a measure of corrosion performance, with increasing weight gain showing an increase in corrosion and therefore poorer resistance to corrosion. The data in Table 2 illustrates that the corrosion resistance of alloys VA and VB made in accordance with the present invention was superior to that of Zircaloy-2 and other alloys outside the scope of the present invention.

Of greater significance is the unexpectedly low level of hydriding observed with the alloys of the invention as compared to Zircaloy-2. Hydriding in two of the irradiated Zircaloy-2 coupons was 23 and 133 ppm $H_2$ respectively. In contrast, the irradiated coupons made from alloy VB of this invention had a level of <10 ppm $H_2$.

Figure 2:
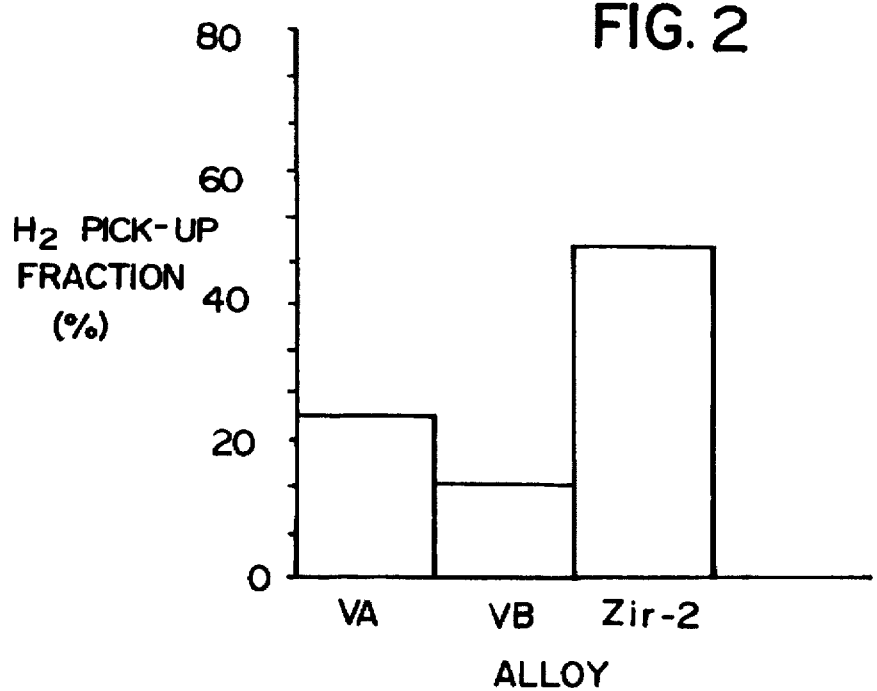
FIG. 2 is a bar graph of the hydrogen pick-up fraction of the same alloys of FIG. 1 after 280 days post-irradiation corrosion test (400° C. steam test).

FIGS. 1 and 2 show the hydrogen content data and hydrogen pick-up fraction data for Zircaloy-2, VA and VB obtained in post-irradiation corrosion testing. The hydrogen pick-up fraction is obtained taking the amount of hydrogen picked up by the alloy and dividing by the amount of hydrogen produced in the corrosion reaction. In this test, pre-irradiated two reactor cycle specimens are tested in 400° C. steam (at 1500 psi) for up to 280 days in an autoclave. In the Figures, each data point represents an average value of two specimens. It is believed that post-irradiation corrosion testing in 400° C. steam can predict the effect on corrosion resistance of long-term in-reactor exposure. The alloys VA and VB both had very low hydrogen pick-up values (VB less than 300 ppm; VA less than 500 ppm) and low hydrogen pick-up fractions (VB less than 20%; VA less than 30%), as compared to Zircaloy-2 (hydrogen content about 620 ppm; pick-up fraction about 48%). The low hydriding properties and low weight gain are good attributes for zirconium-based alloys subjected to the environment in a nuclear reactor core.

The corrosion weight gain data in Table 2 further shows that coupons of alloy V (not of this invention) have high and variable corrosion in high-temperature water in a boiling water reactor. The addition of tin to alloy V in amounts of 0.1 to 1.0 wt. %, as in the alloy of this invention, decreases the magnitude and variability of corrosion, as demonstrated by the lower corrosion weight gain data for alloys VA and VB of this invention.

Table 3 lists data from measurements of various mechanical properties of unirradiated and irradiated specimens made from sheets of Zircaloy-2, alloy Va and alloy VB. The data in Table 3 show that irradiated alloy VA and irradiated alloy VB are stronger (UTS) and have higher ductility (UE and TE) than Zircaloy-2.

TABLE 3

| Specimen No. | Fluence ($10^{25}$ n/m³) | UTS* (MPA) | UE† (%) | TE‡ (%) | Flow Stress Drop |
|---|---|---|---|---|---|
| Alloy VA | | | | | |
| 3A | 0 | 406.5 | 6.2 | 32.4 | Gradual |
| 3B | 0 | 390.7 | 8.9 | 33.9 | Gradual |
| 3C | 2.65 | 751.0 | 2.4 | 16.1 | Rapid |
| 3D | 2.65 | 736.5 | 2.2 | 15.5 | Rapid |
| Alloy VB | | | | | |
| 8A | 0 | 388.6 | 8.3 | 36.5 | Gradual |
| 8B | 0 | 385.2 | 7.9 | 33.2 | Gradual |
| 8C | 3.95 | 828.2 | 3.9 | 18.4 | Gradual |
| 8D | 3.95 | 828.2 | 3.9 | 17.8 | Gradual |
| Zircaloy-2 | | | | | |
| 2-110 | 2.48 | 725.0 | 2.6 | 20.6 | Gradual |
| 2-112 | 2.48 | 654.0 | 0.4 | 14.8 | Rapid |
| 2-114 | 2.48 | 683.0 | 1.1 | 16.9 | Rapid |

*UTS = ultimate tensile strength.
†UE = uniform elongation.
‡TE = total elongation.

It can be seen that the alloy VB has very low hydrogen pickup as compared to the known alloy Zircaloy-2. While not being bound by any theory, it is believed that the improved hydriding properties are attributable to the high chromium content as well as the high chromium:iron weight ratio (about 1.8 to 2.3:1, preferably about 2:1).

In summary, alloys having a composition of about 0.3–1.2% Sn, about 0.8–1.4% Cr, about 0.05–0.7% Fe, and remainder substantially Zr have an improved hydriding resistance as well as good resistance to corrosion and improved post-irradiation strength and ductility, as compared to Zircaloy-2. Accordingly, alloys having an elemental composition in accordance with the invention are suitable for use in BWR components which are exposed to high levels of neutron fluence, such as fuel channels, fuel cladding and fuel rod spacers.

What is claimed is:

1. A zirconium-based alloy having a composition consisting essentially of, by weight, about 0.3–1.2% tin, at least 0.8 to about 1.4% chromium, about 0.05–0.7% iron, and the remainder substantially zirconium.

2. The zirconium-based alloy of claim 1, consisting essentially of about 500–2000 ppm $O_2$.

3. The zirconium-based alloy of claim 2, being substantially nickel free.

4. The zirconium-based alloy of claim 1, wherein tin is about 0.5%.

5. The zirconium-based alloy of claim 4, wherein chromium is about 1.0%.

6. The zirconium-based alloy of claim 5, wherein iron is about 0.5%.

7. The zirconium-based alloy of claim 1, wherein the weight ratio of chromium to iron is about 1.8 to 2.3:1.

8. The zirconium-based alloy of claim 7, wherein the weight ratio of chromium to iron is about 2:1.

9. The zirconium-based alloy of claim 1, wherein chromium is about 1.2%.

10. The zirconium-based alloy of claim 1, wherein tin is about 0.5%, chromium is about 1.0% and iron is a about 0.5%.

11. A component of a light water nuclear reactor made from a zirconium-based alloy having a composition consisting essentially of, by weight, about 0.3–1.2% tin, at least 0.8 to about 1.4% chromium, about 0.05–0.7% iron, and the remainder substantially zirconium.

12. The reactor component of claim 11, consisting essentially of about 500–2000 ppm $O_2$.

13. The reactor component of claim 12, being substantially nickel free.

14. The reactor component of claim 11, wherein tin is about 0.5% and chromium is about 1.0%.

15. The reactor component of claim 14, wherein iron is about 0.5%.

16. The reactor component of claim 11, wherein the reactor component is a fuel channel.

17. The reactor component of claim 11, wherein the reactor component is fuel cladding.

18. The reactor component of claim 11, wherein the reactor component is a fuel rod spacer.

19. A zirconium-based alloy having a composition consisting essentially of, by weight, about 0.5% tin, about 1.0% chromium, about 0.5% iron and the remainder substantially zirconium.

* * * * *